Dec. 18, 1923.

W. R. COULSON

DEMOUNTABLE RIM

Filed Oct. 16, 1922

1,478,103

Inventor:
William R. Coulson,
His Attorneys.

Patented Dec. 18, 1923.

1,478,103

UNITED STATES PATENT OFFICE.

WILLIAM R. COULSON, OF STURGEON, MISSOURI.

DEMOUNTABLE RIM.

Application filed October 16, 1922. Serial No. 594,774.

*To all whom it may concern:*

Be it known that I, WILLIAM R. COULSON, a citizen of the United States, and a resident of Sturgeon, Boone County, Missouri, have invented a new and useful Demountable Rim, of which the following is a specification.

This invention relates to demountable rims for wheels.

An object of the invention is to provide an improved rim composed of separable sections adapted to be united to support a tire and detached to permit removal of the tire.

Other objects will appear from the following description, reference being made to the drawing in which—

Figure 1:
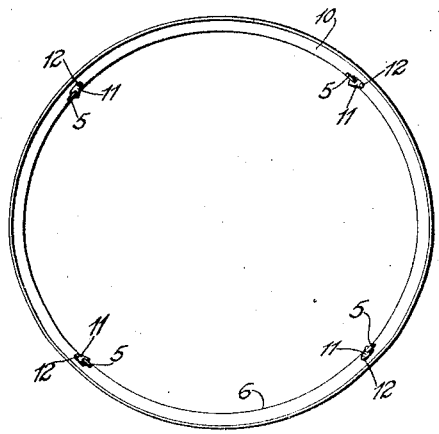
Fig. 1 is a side elevation of a rim embodying my invention.
Figure 2:
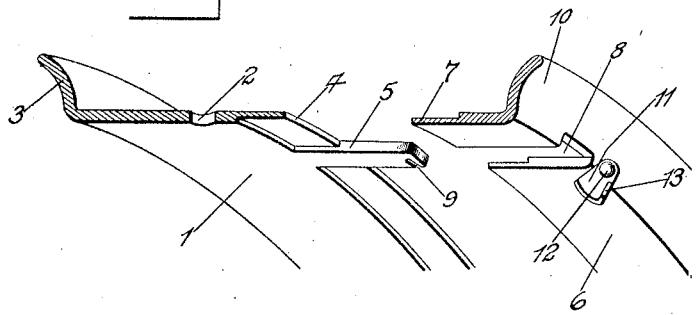
Fig. 2 is a perspective view showing portions of the two parts of the rim separated.

In the embodiment of the invention shown the rim is composed of two sections of which the section 1 is the wider of the two and has a hole 2 therethrough through which the usual tire valve (not shown) may be passed and withdrawn in mounting and demounting the tire on the rim. A tire engaging flange 3 is at the outer edge of the section 1 and an extended portion 4 of approximately half the thickness of the section 1 extends from the inner edge of said section 1. The inner surfaces of the part 1 and the extending portion 4 thereof are in alinement, so that a notch is provided within the part 4, said notch being defined by the edge of the section 1 and by the inner side of said part 4.

The part 1 is provided with integrally united laterally extending arms or extensions 5. The extensions 5 are also integral with the part 4, so that they have sufficient strength and rigidity. As shown, the radial thickness of the extensions 5 is equal to the radial thickness of the part 1, though said extensions may be of any desired thickness and width. The inner surfaces of the extensions 5 are in alinement with the inner surfaces of the portion 4 throughout their length.

Figure 3:
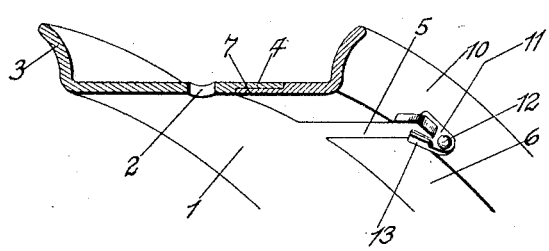
Fig. 3 is a perspective view showing the two portions of the rim united.

The other part of the rim comprises an annular portion 6 of the same thickness as the part 1 and having an extended portion 7 in connection with its inner edge adapted to telescope within the extended portion 4 of the part 1, as will be readily understood by reference to Fig. 3 in which it will be seen that the combined radial thickness of the portions 4 and 7 is equal to the thickness of the parts 1 and 6, said last-named parts being of equal radial thickness. Notches 8 are formed in the rim part 6, said notches extending throughout the width of said part 6 and having a radial depth equal to the radial thickness of the extensions 5.

When the two rim parts are placed in assembled relationship, as shown in Fig. 3, the extensions 5 are received within the notches 8 thereby preventing said parts from turning relatively. A notch 9 is formed near the outer end of each of the extensions 5 and, when the two rim parts are placed in assembled relationship, the notches 9 are outside of the rim part 6 and close to the tire engaging flange 10 thereof. Latches 11 are pivoted to the rim part 6 or to the tire engaging flanges 10 thereof adjacent to each of the notches 8. Said latches are mounted on pivots 12 which may be in the form of rivets that will stiffly or frictionally hold the latches with the desired degree of firmness but will permit them to be tapped or driven into or out of the notches 9 to latch the rim parts together. Each of the latches 11 may have a rib or flange 13 on its inner portion to contact with the engaged extension 5 and prevent the latches from being driven too far when being adjusted. In any event, the latches are held with sufficient firmness to prevent them from being worked out of the notches 9.

It will be seen that my invention is a highly efficient and simple one and that the rims may be of any desired size. The rim comprises a minimum number of parts and may be easily assembled or detached.

I am aware that the specific construction and formation may be varied without departure from the nature and principle of the invention, and do not restrict myself unessentially, but what I claim and desire to secure by Letters Patent is:—

1. A rim comprising a pair of cylindrical section, telescoping portions at the adjacent edges of said sections, arms integral with one of said sections extending beyond the outer edge of the other section, and latches at the outer side of said other section for engaging said arms to hold said sections together.

2. A rim comprising two annular sections arranged in telescoping engagement and one of said sections having notches extending from its outer side inwardly toward the other section, arms on said other section seated in said notches and extending beyond the outer edge of the section containing the notches, and latches on the section containing the notches for engaging said arms.

3. A rim, comprising two telescoping annular sections one of which is wider than the other, and the narrower of said sections having notches extending from its outer edge to the wider section, and the wider section having a hole therethrough spaced from the other section adapted to receive a tire valve; arms integral with said wider section having a radial thickness equal to the full radial thickness of each of said sections and having their inner surfaces in continuation of the inner surfaces of said two sections; and devices supported by the narrower section for engaging said arms to hold said sections together.

4. A rim comprising two telescoping annular sections one of which has notches extending from its outer edge to the other section, arms integral with said other section seated in said notches and holding the two sections from turning relatively, said arms having notches near their outer extremities, and latches pivoted to the section containing the notches in which said arms are seated movable into and out of the notches in said arms.

WILLIAM R. COULSON.